(12) United States Patent
Shintani et al.

(10) Patent No.: US 8,156,545 B2
(45) Date of Patent: Apr. 10, 2012

(54) METHOD AND APPARATUS FOR AUTHORIZING A COMMUNICATION INTERFACE

(75) Inventors: Peter R. Shintani, San Diego, CA (US); David C. Boyden, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1219 days.

(21) Appl. No.: 11/673,522

(22) Filed: Feb. 9, 2007

(65) Prior Publication Data

US 2008/0196086 A1 Aug. 14, 2008

(51) Int. Cl.
- *H04L 9/32* (2006.01)
- *H04L 9/00* (2006.01)
- *G06F 7/04* (2006.01)

(52) U.S. Cl. ............ 726/4; 726/3; 726/5; 726/6; 726/7; 713/155; 713/156; 713/157; 713/158

(58) Field of Classification Search ........................ 726/4
See application file for complete search history.

(56) References Cited

U.S. PATENT DOCUMENTS

| | | |
|---|---|---|
| 6,715,077 B1 | 3/2004 | Vasudevan et al. |
| 6,748,537 B2 | 6/2004 | Hughes |
| 6,816,972 B1 | 11/2004 | Kutaragi et al. |
| 2002/0147686 A1 | 10/2002 | Safadi et al. |
| 2003/0056114 A1* | 3/2003 | Goland ............ 713/201 |
| 2004/0215964 A1 | 10/2004 | Barlow et al. |
| 2005/0033964 A1 | 2/2005 | Albanese et al. |
| 2006/0064582 A1* | 3/2006 | Teal et al. ............ 713/156 |
| 2006/0242697 A1 | 10/2006 | Takemura |

FOREIGN PATENT DOCUMENTS

| | | |
|---|---|---|
| EP | 1096446 | 5/2001 |
| TW | 227826 | 2/2005 |
| WO | WO-9738530 | 10/1997 |
| WO | WO-9943120 | 8/1999 |
| WO | WO-02087144 | 10/2002 |

OTHER PUBLICATIONS

Inoue, Atsushi, English Translation of the Abstract of JP26059127, published Feb. 3, 2006.
Chmielewski, Dawn D. "Furor Over Sony Patent Technology that could prevent resale of games and other digital goods raises speculation, fears." L. A. Times, Jul. 10, 2006.
Int'l Searching Authority, , International Search Report and Written Opinion of the International Searching Authority for PCTUS2008053395 mailed Jun. 27, 2008.
European Search Report from the European Patent Office for App. No. 087293676 dated Dec. 23, 2010.
Office Action from the European Patent Office for European App. No. 087293676 dated Sep. 12, 2011.
First Office Action from the State Intellectual Property Office of the People's Republic of China for App. No. 200880004477X dated Sep. 26, 2011.

* cited by examiner

*Primary Examiner* — Longbit Chai

(74) *Attorney, Agent, or Firm* — Fitch, Even, Tabin & Flannery LLP

(57) ABSTRACT

A method and system for authorizing a communication interface between a first and second module comprises detecting a coupling between a first module and a second module, certifying a first pairing certificate is valid between the first module and the second module, and issuing a first operating certificate and storing the first operating certificate on at least one of the first module and the second module.

17 Claims, 7 Drawing Sheets

METHOD AND APPARATUS FOR AUTHORIZING A COMMUNICATION INTERFACE

BACKGROUND OF THE INVENTION

1. Field of the Invention

The present invention relates generally to an interface security method and apparatus.

2. Discussion of the Related Art

Many electronic devices are made to communicate with other electronic devices by, for example, mechanically and/or electronically coupling together through a connector, a cable, wire or wirelessly. Manufactures design the electronic devices to couple with other devices and communicate by transmitting and/or receiving information to/from the other device. The coupling between devices may be locally physically attached, next or near to the other device, or there may be a distance between the devices that requires the communicating to be over a cable, wire or wirelessly.

Some manufactures find it advantageous to design the electronic device to be capable of coupling with multiple types of electronic devices manufactured from multiple companies. However, some manufacturers design the electronic devices to couple with a specific type of electronic device, for example, those designed by the same or related company. The interfaces for these electronic devices are considered to be proprietary. Additionally, some software components on an electronic device are proprietary, and are often only licensed to the customer for a particular use. Thus, when purchasing some electronic devices, customers must often agree to certain licensing and/or use restrictions of the software components. Typical licensing agreements include, but are not limited to, the user refraining from copying the software for use in other electronic devices.

However, some users still access the electronic devices in an unauthorized manner, e.g., the proprietary systems are "hacked" by a customer, in order to steal or improperly use the software components. Additionally, the electronic devices and/or software components may be sold or used in a manner that is not approved by the module's vendor, or authorized under, for example, a licensing agreement.

Many designers and manufacturers prefer to protect the time and money spent in designing and providing highly advanced electronic devices to consumers, and to deter the hacking and illegal use of the electronic devices. It is advantageous for a manufacturer to know that their electronic devices will only be properly paired (e.g., coupled and communicating) with approved devices. And thus, a way to prevent unauthorized access to the electronic device's proprietary interface is needed to insure proper usage and assurance that a hacker is unable to migrate the device or it's software components to an unauthorized system.

SUMMARY OF THE INVENTION

Several embodiments of the invention advantageously address the needs above as well as other needs by providing methods and systems for authorizing a communication interface between a first and second module comprises detecting a coupling between a first module and a second module, certifying a first pairing certificate is valid between the first module and the second module, and issuing a first operating certificate and storing the first operating certificate on at least one of the first module and the second module.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
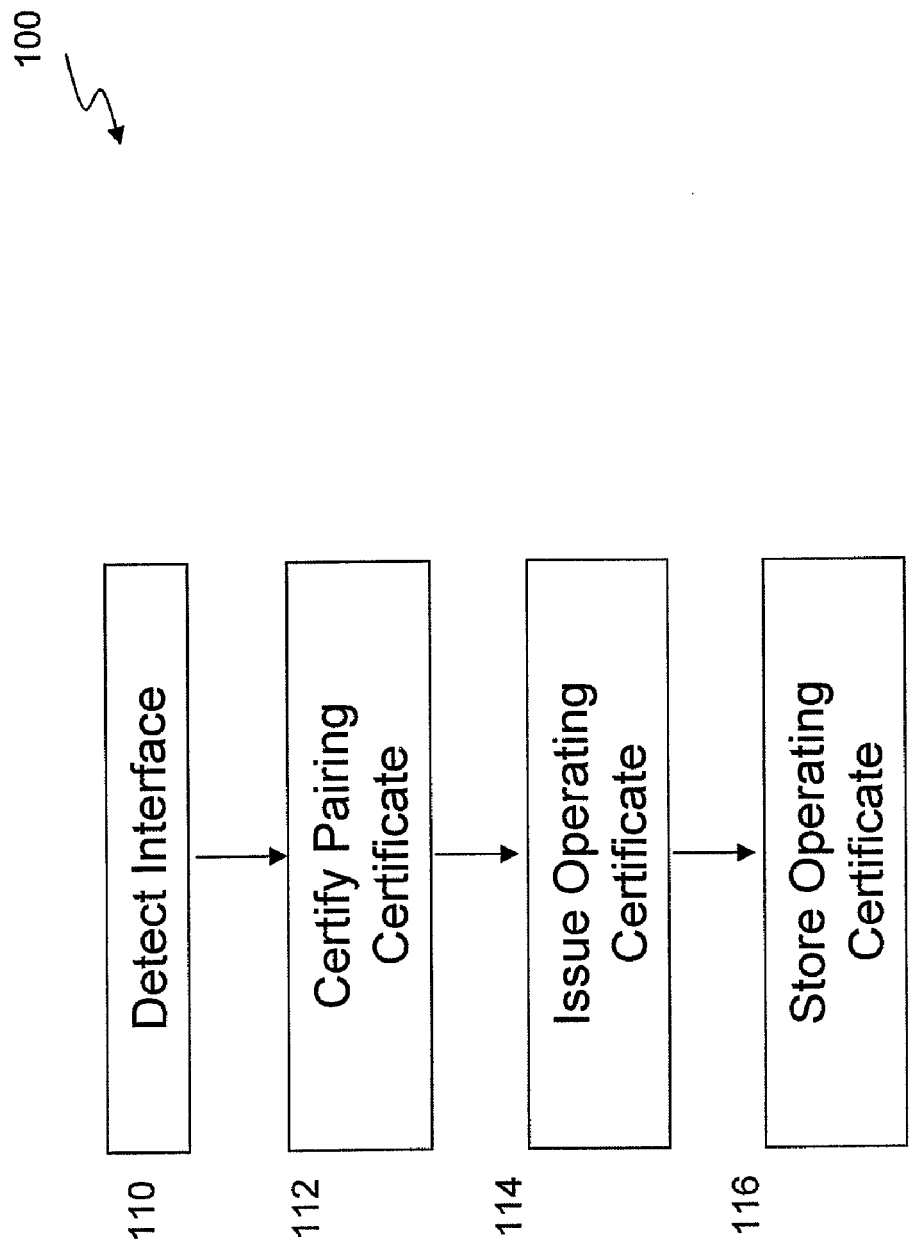
FIG. 1 is a flow diagram of an embodiment for authorizing a communication interface between modules.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention sets forth an apparatus, system and method for verifying proper coupling and securing an interface between modules.

Referring first to FIG. 1, a flow diagram of method 100 illustrates an embodiment used in authorizing a communication interface between modules. In some variations of the present embodiment, a first module and a second module are coupled together and communication is allowed if the interface between the modules is authorized. The method 100 comprises determining if the interface is secure, or authorizing a communication interface, and may be used to protect, for example, a module from communicating with more than a predetermined maximum number of separate modules. Thus, method 100 also provides a way for protecting the module from communicating with a module that is not pre-approved by the module's manufacturer, or authorized under, for example, a licensing agreement.

Once the communication interface is authorized, the modules are considered "paired" together. In some variations, the devices are able to "pair" with one or more other devices. The pairing of the devices may be transient, however, because the devices may be de-coupled or disconnected from each other and then re-attached or connected. Thus, the modules may be able to subsequently pair back up with the module that had previously authorized a communication interface with.

In some variations of the present embodiment, the first module may be configured to couple with only one other module, and thus, the only authorized communication interface is with the module with which is first coupled to and determined the coupling or pairing is approved and/or proper. In other variations, the module may be configured to couple with only a certain type of module (e.g., only modules with acceptable attributes, such as, a specific manufacturer, memory size, speed, etc.) or a predetermined number of modules. By way of example, a module may comprise a video game, and the module may be configured to couple with only gaming consoles manufactured, designed, or sold by a specific company. For example, the video game module may be configured and pre-approved to work and communicate with up to three different gaming consoles. Thus, the method 100 provides an embodiment that may be used to protect the video game module from communicating with an unauthorized gaming console by preventing or disallowing the exchange information from the video game module.

The method 100 begins with step 110 wherein a coupling between the first module and the second module is detected. In some embodiments, a coupling is detected when the first and second modules are coupled or connected together and, for example, one of the modules is attempting to establish a communication interface between the modules. Detecting the coupling may comprise, for example, at least one of the first module or the second module detecting loading on a port. In some variations, detecting a load may comprise detecting a change in resistance, a change in current draw, a pin pulled to ground or any other method known in the art. For example, in some embodiments, detecting a coupling may comprise the first module receiving a signal indicating that the second module is attempting to establish a communication interface. Further, detecting the coupling may also comprise detecting that it is a second or subsequent attempt to establish a communication interface.

In some variations of the present embodiment, the first module may request some kind of identification from the second module to verify that the second module is authorized to communicate with the first module. The identification requested may be, for example, a certificate issued to the second module during manufacturing. The second module may be configured to send the certificate upon attempting to establish a communication interface or attempting to couple with another module. In some variations, this identification is a pairing certificate, and at least the first module and/or the second module is issued a unique pairing certificate prior to a customer purchasing the module. Further, in some embodiments the pairing certificate is secret and remains protected or encrypted upon submitting or transferring it in order to establish the communication interface.

In some embodiments, the first module and/or the second module may request the pairing certificate from the module in a first attempt to establish a communication interface. In other embodiments, at least one of the first module or the second module may automatically submit the pairing certificate to the other module upon detecting a coupling or a connection of the two modules and the fact that it is an initial attempt to establish a communication interface.

In step 112, the pairing certificate is certified to be valid between the first module and the second module. In some variations of the present embodiment, certifying that the pairing certificate is valid may comprise the first and/or the second module accessing a database or a table listing the type, manufacturer and/or unique identification information for each module with which it is authorized to communicate. In some embodiments, the determination may include the first module and/or the second module finding the manufacture of the coupling module in the database of authorized manufacturers.

Alternatively or additionally, the first module and/or the second module may find the unique identification information, such as the pairing certificate, of the coupling module listed in the database. The certifying of the pairing certificate is verification that the first module and the second module are pre-approved to pair or pre-approved to authorize a communication interface with each other. However, the communication interface between the modules must still be authorized before the pair of the first module and second module may continue or is are allowed to communicate with the others in the pair.

Once the pairing certificate is certified, in step 114, an operating certificate is issued to the first module and/or the second module. The operating certificate is unique between the first module and the second module, and in some embodiments, once used, may not be regenerated or copied for use in another system. In some variations, the operating certificate is issued by one module to the other module (e.g., the second module issues the operating certificate to the first module). In other variations, the first module and/or the second module may receive the operating certificate from a remote device, for example, a server accessed over the internet. Furthermore, the operating certificate may be unique between more than two modules, all of which are being paired together in an authorized communication interface.

In some variations, after the operating certificate is issued to the first module, for example, the first module submits the operating certificate to the second module. Accordingly, in step 116, the first and/or second module stores the operating certificate. In some variations, once the operating certificate has been issue and/or stored, the first and/or second modules may authorize the communication interface. In some variations, the first and/or second module further confirms the operating certificate before authorizing the communication interface. Thus, the properly coupled first module and second module are permitted to continue with paired communications over the authorized communication interface. In other words, the modules are paired together with a secure interface and may exchange information, and in some embodiments, are protected from migrating or interfacing to another unauthorized module. In some embodiments, the pairing of the modules is certified at the point of certifying the pairing certificate, but is not confirmed and authorized until the operating certificate has been issued.

Additionally, because, in some embodiments, the operating certificate is unique between the first module and the second module, the second module may be configured to recognize it was once paired with the first module. Thus, the second module may authorize the communication interface upon the first module subsequently coupling to the second module by detecting it is a subsequent attempt to establish communication and thereby confirming the validity of the operating certificate.

By way of example, the first module may contain a new software application that a user desires to transfer to the second module, such as a personal computer (PC). The first module is not configured to transfer the new software application to an unauthorized PC, and is configured to only transfer the new software application to a device where the communication interface has been authorized. Thus, in some embodiments, the first module authorizes the communication interface with the second module prior to transferring the new software application. Further, if the first module is unable to authorize the communication interface, the first module will pause communication until the interface has been authorized or, alternatively, may terminate communication with the second module if the interface is not authorized.

Continuing with the example above, the first module detects that it is being coupled to the PC (e.g., step 110) and submits the pairing certificate appointed to the first module at the time of manufacturing. The PC is configured to review a list of pairing certificates to certify that the one submitted by the first module is valid (e.g., step 112). Once the PC certifies the pairing certificate of the first module, an operating certificate is issued to the first module (e.g., step 114), and is typically stored on the first module (e.g., step 114). In some embodiments, the first module submits the operating certificate to the PC; the PC confirms the operating certificate valid, and sends an authorization to the first module to allow paired communication. In other embodiments, receiving the operating certificate from the PC indicates that the communication interface is authorized, and thus, the first module allows paired communication between the first module and the PC. The first module is now authorized to transfer the new software application to the PC.

Additionally, the first module may be removed from the PC and subsequently coupled again to the PC. Upon a second or subsequent coupling, the communication interface between the first module and the PC must again be authorized. Thus, the first module may submit the previously issued operating certificate for the PC to confirm is valid. Once the first module again receives authorization from the PC, the first module authorizes the communication interface and allows paired communication. Thus, if needed, the first module may be authorized to again transfer the software application to the PC.

It is noted, however, that the operating certificate is not configured for authorizing a communication interface between the first module and a different PC. Thus, the first module will repeat the sequence for authorizing the communication interface with all other PCs and devices with which it is attempting to couple. In some embodiments, the first module may be unable to authorize a communication interface with other devices in order to protect the software application on the first module from being hacked or used in an unauthorized manner.

In some variations of the present embodiment, a module may be configured to couple with a predetermined maximum number of devices. In some embodiments, one method of configuring the module to limit the number of devices with which it may couple is by modifying the pairing certificate after a communication interface is authorized. For example, in some embodiments, the pairing certificate appointed to the module and is stored in memory on the module prior to the customer purchasing the module. In some variations, the pairing certificate is modified by erasing the pairing certificate from memory after authorizing a first communication interface. Thus, the module is unable to submit the pairing certificate to another coupling device after it has been erased, and accordingly, the module is limited to paired communication with only one device.

In other embodiments, the pairing certificate may be modified by the module to indicate the number of devices with which it has previously submitted the pairing certificate, paired and/or authorized a communication interface (e.g., the number of interfaces the module has determined secure). And once the predetermined maximum number of devices with which the module pairs with is reached, for example, the module may be required to modify, erase and/or obliterate the pairing certificate. Thus, after modifying the pairing certificate, in some embodiments, the module is protected from communicating with an additional device.

Figure 2:
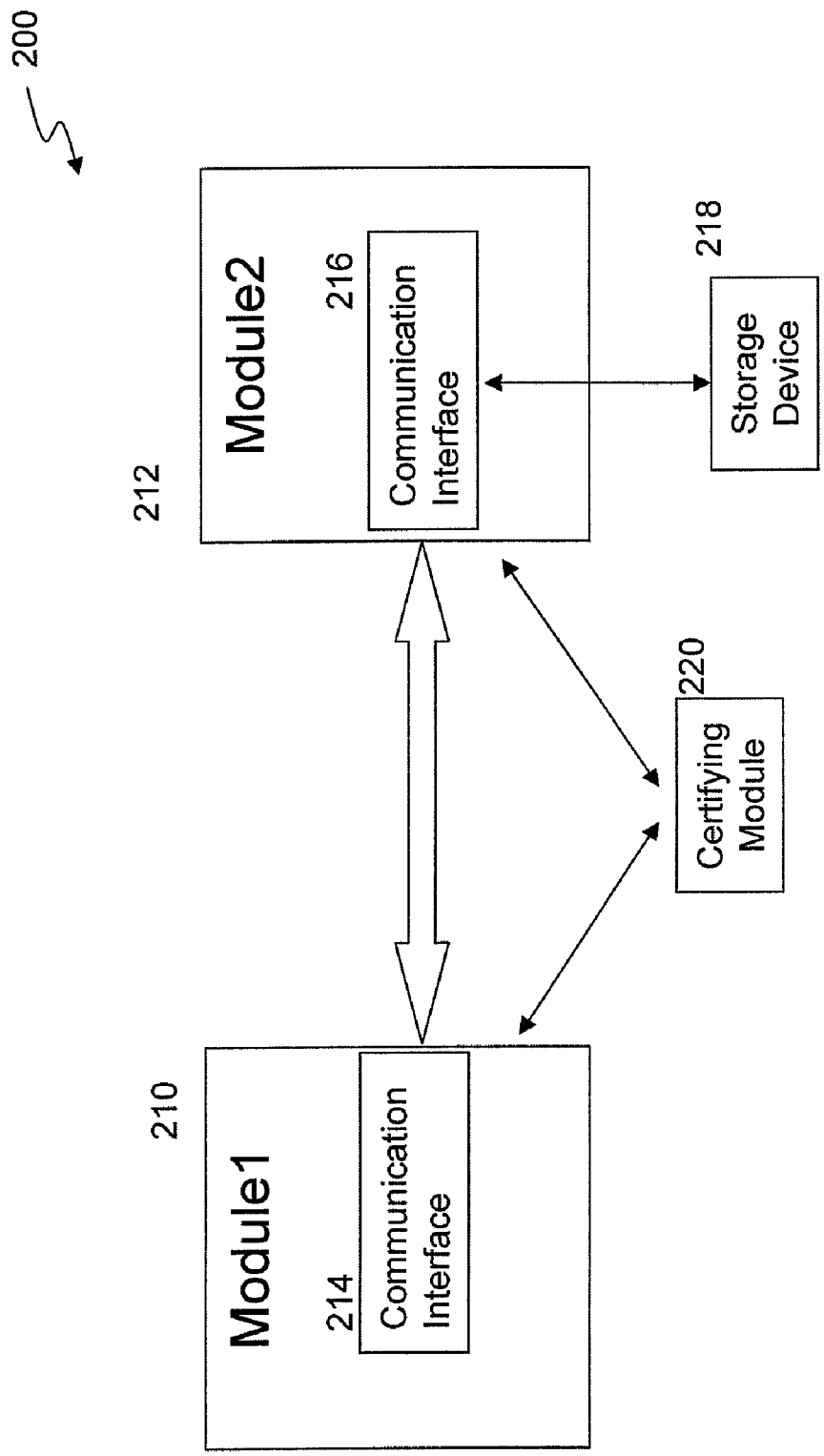
FIG. 2 is a block diagram of an embodiment for coupling modules for authorizing a communication interface.

Referring next to FIG. 2, a block diagram of system 200 illustrates an embodiment for pairing modules and authorizing a communication interface. The system 200 comprises a first module 210 with a communication interface 214, a second module 212 with a mating communication interface 216, a certifying module 220 and a storage device 218.

The communication interface 214 of the first module 210 is configured to couple with the mating communication interface 216 of the second module 212. Additionally, the certifying module 220 is in communication with at least one of the first module 210 and/or the second module 212, and the storage device 218 is in communication with the second module 212.

In some embodiments, the system 200 may be used to prevent unauthorized devices from using a proprietary interface. Additionally, the system may be used to prevent unauthorized migration (e.g., removal from the originally paired module to another module). By way of example, a first module 210 pairs with and/or authorizes a communication interface with a second module 212. The first module 210 is removed from the second module 212 and is connected to another module (e.g., the module is attempting to be migrated to another system). In some embodiments, the first module 210 will be unable to authorize a second communication interface with another module, and thus, is unable to migrate to and be used in another system. By implementing the method 100 described above, the first module 210 may be protected from authorizing a communication interface elsewhere and will remain "paired" with the second module 212.

The communication interface 214 and the mating communication interface 216 are configured to transmit/receive communications to/from the first module 210 and the second module 212; wherein the mating may be mechanically through a connector, over a cable, wire or wirelessly. In some embodiments, a wireless coupling may include communicating optically or over radio frequencies. In some embodiments, the communication interface 214 and/or the mating communication interface 216 may be configured to verify whether or not the first module 210 and the second module 212 are approved to communicate or pair. Furthermore, the communication interface 214 and/or the mating communication interface 216 may be configured to authorize the communication interface between the first module 210 and the second module 212.

By way of example, the first module 210 detects a module coupling to the communication interface 214 by receiving, for example, a power-on signal, a hot plug detect signal, detecting an increase in current being drawn from the communication interface 214 or detecting a pin or signal line being pulled to ground. As described above, the communication interface 214 may be configured to initiate the authorization of a communication interface (e.g., step 112, of method 100) between the first module 210 and the second module 212, by requesting identification information from the mating communication interface 216.

In some embodiments, the second module 212 may retrieve a pairing certificate, for example, from the storage device 218 to submit to the first module 210 through the mating communication interface 216. In some embodiments, the pairing certificate is a unique identification code appointed to the second module 212, indexed in a database and installed or stored in the storage device 218 prior to the customer purchasing the second module 212.

As described above, in some embodiments, the first module 210 first certifies that the second module 212 is authentic and is a pre-approved device with which the first module 210 may couple. In some embodiments, this is accomplished by the first module 210 communicating with the certifying module 220 in order to certify that the pairing certificate submitted by the second module 212 is valid. In some variations of the present embodiment, the certifying module 220 may access information in the database to compare the pairing certificate to the indexed list of acceptable modules with which to the first module 210 may pair.

In some embodiments, the database information accessed by the certifying module 220 is stored locally, for example, in memory on the certifying module 220. In other embodiments, the certifying module 220 accesses the database information that is stored, for example, on a remote server. In some embodiments, the certifying module 220 may periodically access the remote server over the internet to download and locally store updated information in the database, such that when an attempt to secure an interface is made, the certifying module 220 can access the database rapidly.

In some variations of the present embodiment, the first module 210 and the second module 212 may exchange pairing certificates and individually verify the other module is acceptable or pre-approved with which to pair. In yet other embodiments, each of the first module 210 and the second module 212 comprise a certifying module 220, and, for example, may further be configured to access a server on a network in order to certify the submitted pairing certificate is listed in the database of pre-approved devices with which to pair.

Once the pairing certificate has been certified, an operating certificate may be issued to at least one of the first module 210 and/or the second module 212. In some variations, the communication interface 214 of the first module 210 and/or the mating communication interface 216 of the second module 212 are configured to receive the operating certificate, and must do so in order to authorize the communication interface and allow communication between the modules. In some embodiments, the issued operating certificate may be stored on the first module 210 and/or the second module 212 for future pairing.

In some embodiments, the certifying module 220 issues the operating certificate to the second module 212, and the second module 212 waits for confirmation of authorization after submitting the new operating certificate to the first module 210. In other embodiments, the first module 210 issues the operating certificate to the second module 212 indicating the communication interface is authorized, and thus allowing paired communication. In other variations, once the operating certificate is issued and/or submitted for confirmation by the second module 212, the communication interface between the first module 210 and the second module 212 is authorized, and the modules allow paired communication.

In some embodiments, the issued operating certificate may be stored in the storage device 218 and submitted and certified upon a subsequent coupling of the first module 210 and the second module 212. However, in addition to limiting the number of modules with which the first module 210 and/or the second module 212 may pair, the system may limit the number of times the first module 210 and the second module 212 may pair in similar methods.

In some embodiments, the pairing certificate is secret identification information appointed to the second module 212 by the manufacturer, for example, and is stored in storage device 218. The storage device 218 may be flash or non-volatile memory configured to be modified by the second module 212. Thus, once the second module 212 authorizes a communication interface with the first module 210, either the first module 210 and/or the second module 212 may erase or modify the pairing certificate stored in the storage device 218. Accordingly, once the second module 212 erases the pairing certificate, for example, the second module 212 is unable to subsequently pair or authorize a communication interface with new devices, as the information required for authorization is no longer available.

In some embodiments, the first module 210 may be a television (TV), for example. The TV may detect when a device, such as the second module 212, is connected to an input or output port of the TV, e.g., the communication interface 214 of the first module 210. In some embodiments, the TV may detect a coupling by receiving, for example, a power-on signal or hot-plug detect signal from the second module 212 at the communication interface 214. After detecting the coupling of the device, an authorization sequence is initiated either by the TV or the second module 212. In some embodiments, the second module 212 initiates the authorization by submitting a pairing certificate to the TV, or, for example, the TV may initiate the authorization sequence by requesting identification information from the second module 212 attempting to communicate. Next, the TV certifies the pairing certificate through the certifying module 220, for example, by locating the pairing certificate in a database listing devices that are pre-approved for communication. After certifying that the pairing certificate is valid, the TV issues the second module 212 an operating certificate.

Accordingly, in some embodiments, the second module 212 confirms authorization by submitting the issued operating certificate to the TV. Once the TV confirms the operating certificate is valid, the communication interface between the TV and the second module 212 is authorized. At this point the second module 212 may modify or destroy the pairing certificate. In some embodiments, the second module 212 stores the operating certificate in the storage device 218, or, for example, replaces the pairing certificate with the operating certificate. Accordingly, if the second module is removed from the TV, upon a subsequent coupling the second module 212 submits the operating certificate again to the TV. The TV confirms the operating certificate to be valid. At this point, the TV and the second module 212 authorize the communication interface, and operational status is reached wherein the TV and second module 212 are paired together and are allowed to communicate over the authorized communication interface.

In some embodiments, the certifying module 220 is configured on the TV, and may be configured to access a server over a wide area network when certifying the pairing certificate. Additionally or alternatively, the certifying module 220 on the TV may be configured to download, over the wide area network, a list from the database of possible pairing certificates for devices with which the TV is pre-approved to communicate. Additionally, the certifying module 220 on the TV may be configured to receive and/or retrieve operating certificates from a server over the wide area network and transfer the operating certificates to modules with which the TV has certified are proper or pre-approved with which to pair. In other embodiments, the certifying module 220 may be configured to generate the operating certificates for the second module 212.

As mentioned above, the storage device 218 may be configured to store the pairing certificate. In some embodiments, the first module 210 and/or the second module 212 are designed with a communication interface that is configured to use High-Bandwidth Digital Content Protection (HDCP). When using the HDCP licensed format, a key selection vector is used that has a unique value, which is somewhat like a public key, to communicate with other modules. In some embodiments, this key may be appointed and registered in connection with the module when it is manufactured. This key may be used to track a module, and may be used in generating the secret identification code, e.g., the pairing certificate, for the module and indexing the secret identification code in a database. Additionally, the certifying module 220, the first module 210 and/or the second module 212 may have access to the database containing a table listing the key selection vector, the secret identification code and/or pairing certificate, the manufacturer, and the corresponding module, for example. The coupling modules may use this database in order to verify a key actually belongs to the device that is attempting to couple, and is thus valid. This is a method that may be implemented, however, is not necessary to practice the described embodiments.

In some embodiments, the second module 212 may be configured to access the storage device 218 a predetermined maximum number of times. In some embodiments, this could limit the number of times that the second module 212 accesses the storage devices 218 to submit the pairing certificate to a coupling module or, for example, limit the number of times the storage device 218 is accessed to modify the pairing certificate after receiving an operating certificate. This enables a manufacturer to monitor and/or limit the number of devices with which the second module 212 is capable of pairing and authorizing a communication interface. By way of example, if the second module 212 authorizes a communication interface with the TV, and the user attempts to move the second module 212 to another TV, the second module 212 may not be able to authorize a communication interface with the new TV if the pairing certificate of the second module 212 has been submitted the maximum number of times, or, for example, the pairing certificate has been modified or erased such that it may not be certified by the certifying module 220 anymore.

In some variations of the present embodiment, the first module 210 and/or the second module 212, having already been paired in an authorized communication interface, may detect a coupling of a third module (not shown). Thus, in some embodiments, at least one of the first module 210 and/or the second module 212 receives a second pairing certificate from the third module, and certifies that the pairing certificate is valid between the third module and the at least one of the first module 210 and the second module 212. After certifying that the second pairing certificate is valid, a second operating certificate is issued and is stored on at least one of the first module, the second module and the third module. Thus, the communication interface between the third module and the at least one of the first module 210 and/or the second module 212 is authorized, and the third module allows paired communication over the authorized communication interface. In some embodiments, the third module may be paired with only one of the first module 210 and the second module 212. In other embodiments, the third module may be paired with both modules.

Figure 3:
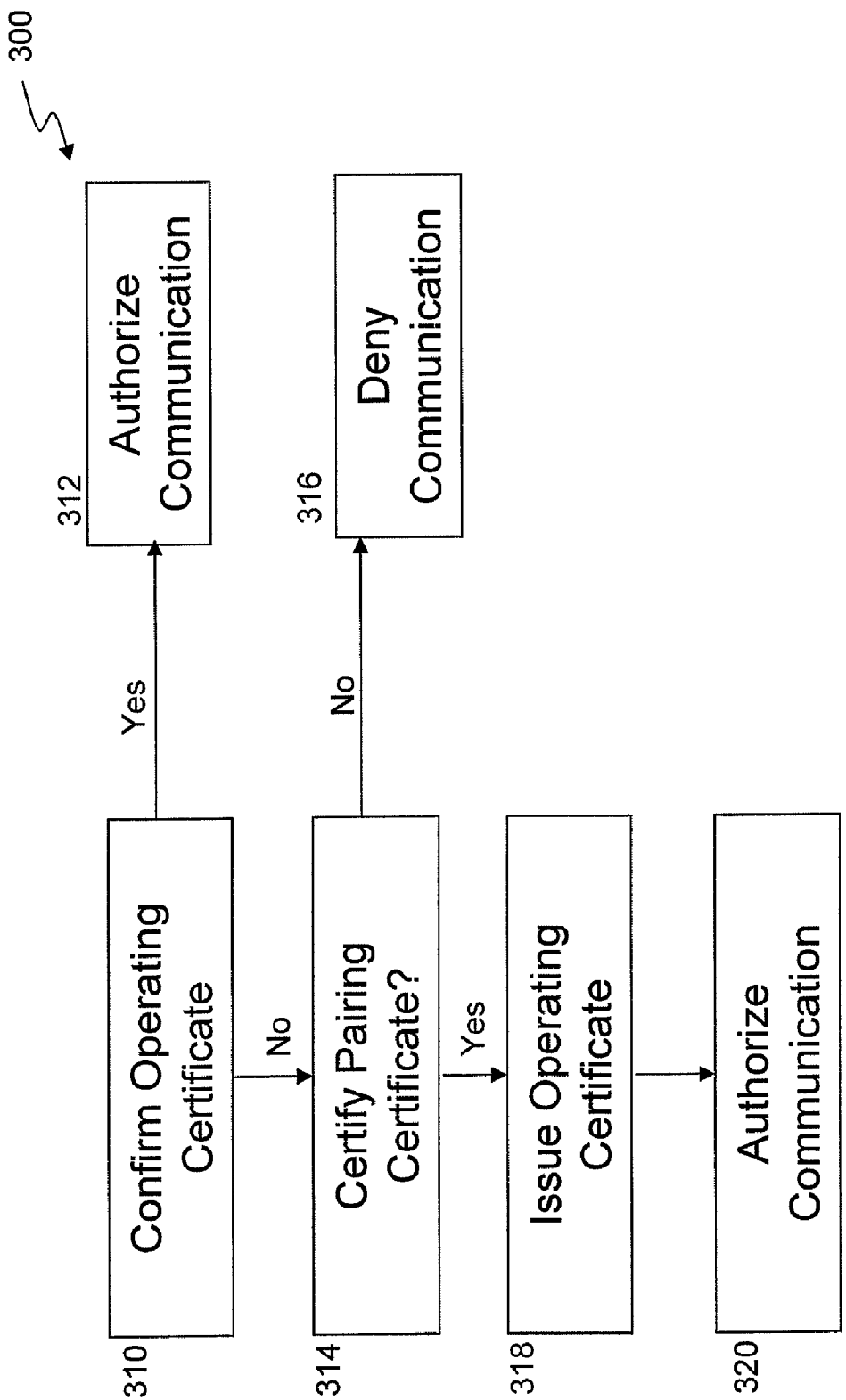
FIG. 3 is a flow diagram of an embodiment for authorizing a communication interface.

Referring next to FIG. 3, a flow diagram of method 300 illustrates an embodiment for authorizing a communication interface. In some embodiments, a first module and a second module are connected together, and in step 310, the first module may begins to establish communication by first certifying if there is a valid operating certificate between the modules. In some embodiments, the operating certificate is automatically submitted or exchanged by at least one of the first module and/or the second module; in some instances, the operating certificate is provided upon request. If there is a valid operating certificate, then in step 312, the communication interface is authorized and the modules are allowed paired communication over the authorized communication interface.

If there is not a valid operating certificate, then in step 314, at least one of the first module or the second module may submit the pairing certificate, either automatically or upon request, and at least one of the first module or the second module certifies that the coupling module's pairing certificate is valid. By way of example, the first module, manufactured by company X, may determine the pairing certificate is not valid, for example, because the second module was manufactured by company Y. Thus, in step 316, the first module determines the interface is not proprietary and thus, not authorized. Accordingly, communication between the first module and the second module is denied and terminated.

However, if the first module determines the pairing certificate is valid, then in step 318, an operating certificate may be issued to at least one of the first module and/or the second module. And accordingly, in step 320, the communication interface is authorized between the first module and the second module, and the pair of modules proceeds with paired communication.

In other embodiments, the second module may have previously coupled with the maximum number of modules, and accordingly, the second module has erased the pairing certificate after the last time the module authorized a communication interface and permitted pairing. Thus, the first module fails to certify the pairing certificate is valid in step 314, and accordingly, determines the interface is not authorized and denies communication.

By way of example, the first module may be configured to provide new features, applications, capabilities and/or functionality to the second module. Thus, the various embodiments of above described method 300 may be used to protect the module from communicating with more than a maximum number of modules, and thus, protecting the first module from transferring these capabilities to unauthorized modules. In other embodiments, the above described variations of method 300 may be used when it is desirable to pair the first module with the second module in order to secure the modules together and limit the use of the first module with other modules. Thus, the method 300 may be used to protect a module and an interface from hacking and non-licensed usage. Therefore, when modules are paired in a secured communication interface with a pre-approved module, and are denied communication when removed from the "pair" set up to an non-approved module, the chance that the interface could be hacked is greatly reduced.

Figure 4:
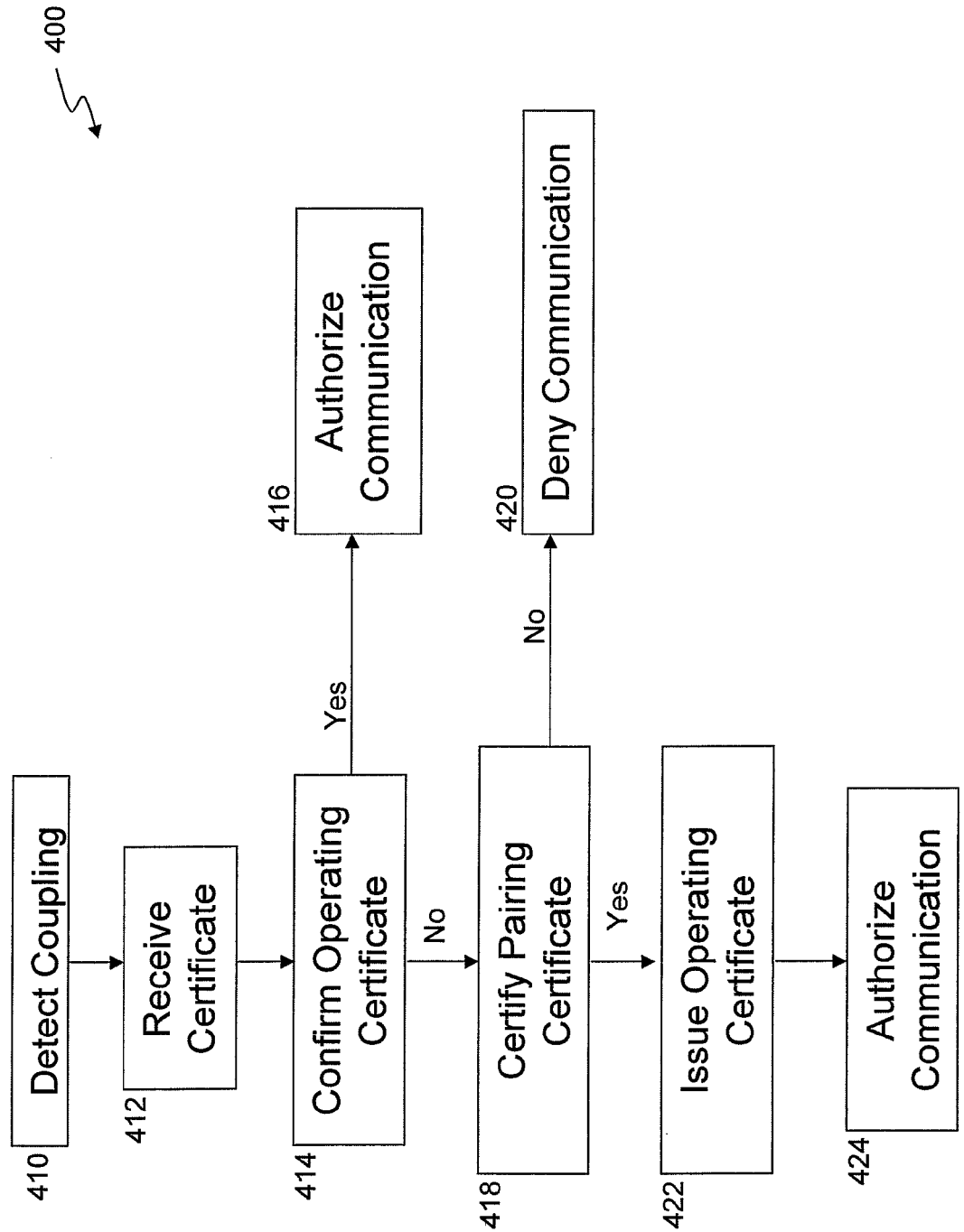
FIG. 4 is a flow diagram of another embodiment for authorizing a communication interface.

Referring next to FIG. 4, a flow diagram of method 400 illustrates another embodiment used in authorizing a communication interface. Also, referring back to the system 200 of FIG. 2, wherein the first module 210 may be considered a host device and the second module 212 may be considered a coupling device.

In some embodiments, the host device comprises a communication interface configured to communicate with the coupling device. Additionally, the communication interface of the host device may be coupled to or in communication with a certifying module. In some embodiments, the certifying module may be a separate device coupled to the host device over a cable, wire, or wirelessly; or, for example, the certifying module may be configured on or part of the host module.

The method 400 begins with step 410, wherein the communication interface of the host device detects that a coupling device is being coupled to the host device. Accordingly, the host device initiates an authorization sequence to determine if the coupling device is configured and/or approved to interface with the host device.

In some embodiments, as shown in step 412, the coupling device may respond to the initiation of the authorization sequence by transmitting a certificate of identification received by the host device. In step 414, the certifying module may first confirm that the certificate of identification is a valid operating certificate. If the certificate is a valid operating certificate, then in step 416, the host device authorizes the communication interface and allows communication with the coupling device.

If the certificate is not a valid operating certificate, then in step 418, the certifying module determines if the certificate is a valid pairing certificate. If the host device fails to certify the certificate is a valid pairing certificate and a valid operating certificate, then in step 420, the host device denies communication with the coupling device. Thus, if the coupling device had previously paired with another host device, the previously authorized communication interface remains secure, and the coupling device is restricted from communicating with a new host device.

In step 422, if the certifying module determines the certificate of identification is a valid pairing certificate, then the certifying module may issue an operating certificate to the coupling device. Accordingly, in step 424, the host device authorizes the communication interface with the coupling device and allows paired communication. Furthermore, in some embodiments, the interface between the host device and the coupling device is secured, and the coupling device may not be capable authorizing a communication interface with another host device.

Figure 5:
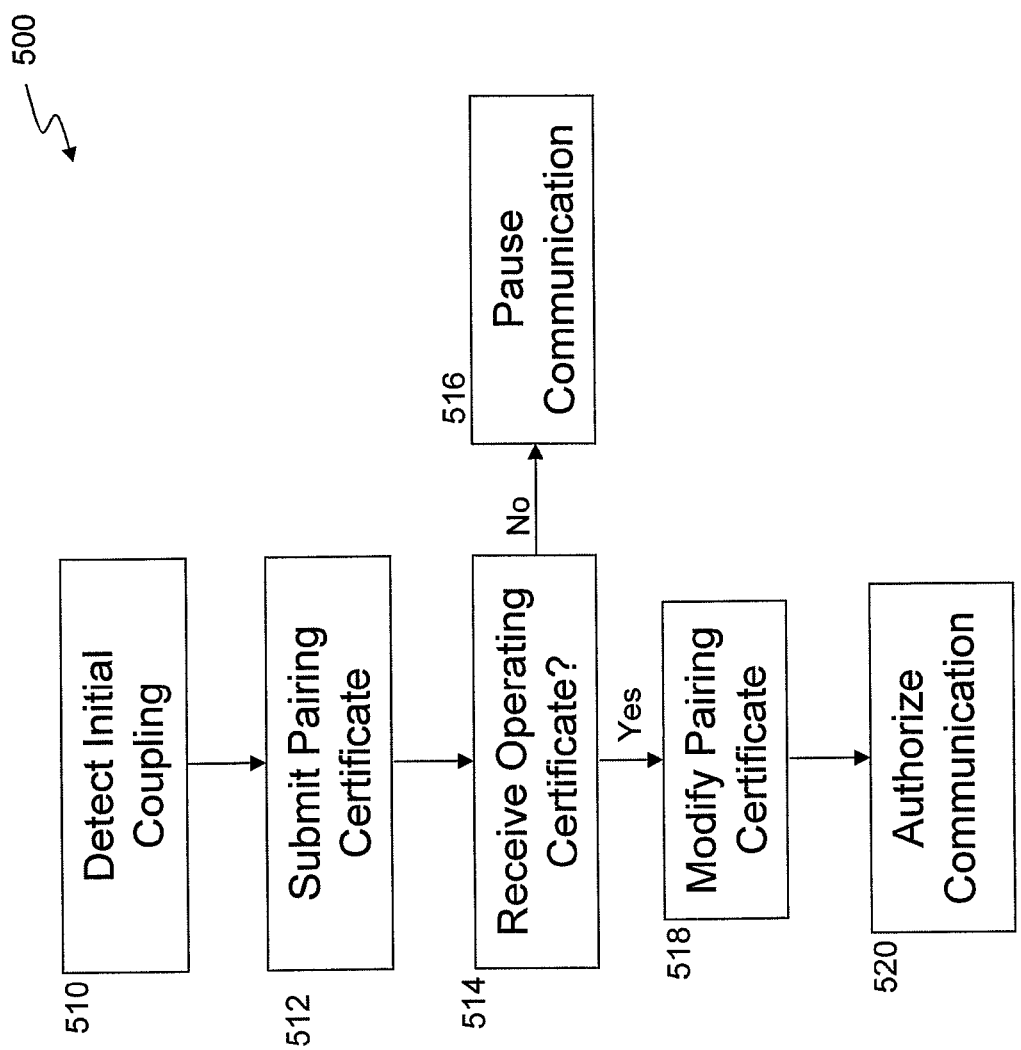
FIG. 5 is a flow diagram of another embodiment for authorizing a communication interface.

Referring next to FIG. 5, a flow diagram of method 500 illustrates another embodiment for authorizing a communication interface between modules. As described above, a coupling device comprising a communication interface may attempt to communicate with a host device. In some embodiments, the coupling device may also comprise a modifiable storage device coupled to the communication interface, wherein the modifiable storage device is configured to store a pairing certificate. The storage device may also be configured to store an operating certificate issued to the coupling device.

Beginning with step 510, the communication interface is configured to detect the coupling device is being coupled to a host device. In some embodiments, the coupling device may be configured to identify that the coupling device has not previously attempted to establish a communication interface with the host device, and thus, this is an initial coupling. Then, in step 512, the coupling device retrieves the pairing certificate from the storage device and submits the pairing certificate to the host device.

The coupling device is configured to wait to receive an operating certificate from the host device. Accordingly, in step 514, the coupling device determines if an operating certificate was received, and, in step 516, if an operating certificate was not received, then the coupling device pauses communication until the operating certificate is received. In step 518, once the operating certificate is received, the coupling device will modify the pairing certificate. Accordingly, in step 520, the coupling device authorizes the communication interface of the host device and proceeds with paired communication. It is noted, that host device may not certify the coupling device, and thus, the pause in communication by the coupling device may be indefinite.

Figure 6:
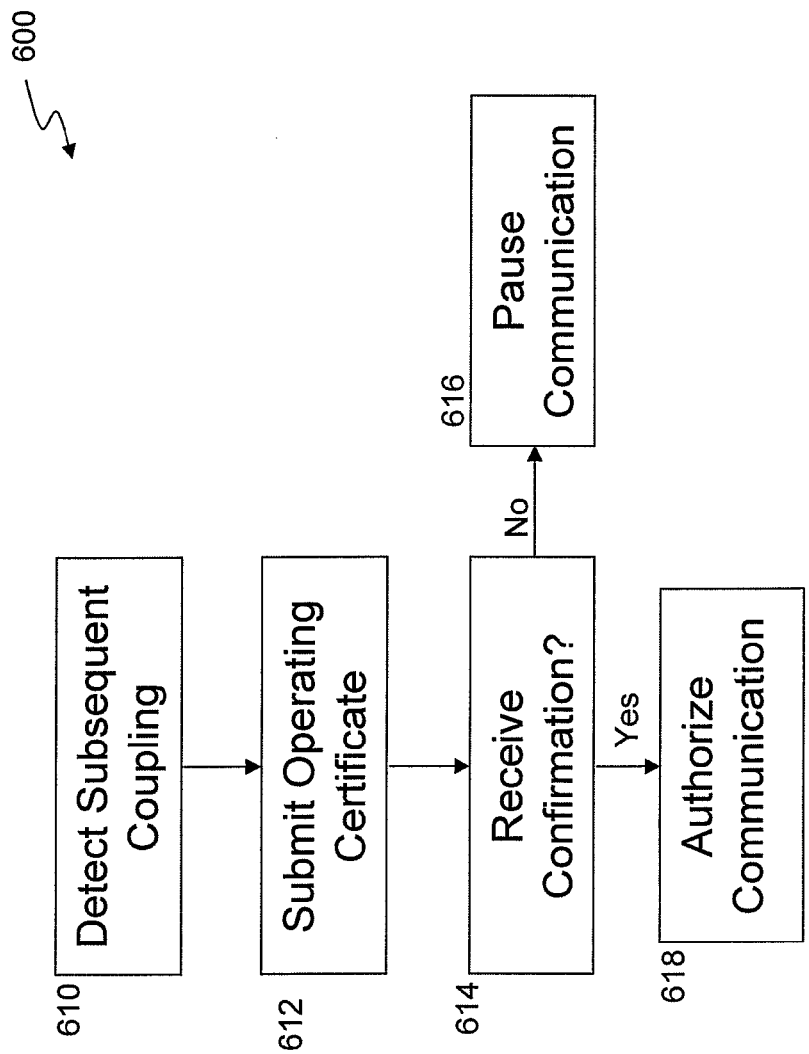
FIG. 6 is a flow diagram of another embodiment for authorizing a communication interface.

Referring next to FIG. 6, a flow diagram of method 600 illustrates another embodiment for authorizing a communication interface between modules. As described above, a coupling device comprising a communication interface may attempt couple (e.g., attempt to establish a communication interface) with a host device. In some embodiments, the coupling device determines that it has previously coupled to and/or attempted to establish a communication interface with the host device. Thus, in step 610, the coupling device detects it is a subsequent coupling with the host device. Next, in step 612, the coupling device submits the previously issued operating certificate. In step 614, the coupling device waits to receive confirmation from the host device that the operating certificate is valid. Thus, in 616, the coupling device will pause communication until the confirmation is received. If confirmation is never received, then the communication interface is not authorized and communication is not allowed. In step 618, if the coupling device does receive confirmation of authorization, then the coupling device authorizes the communication interface with the host device and proceeds with paired communication.

In some embodiments, the modifiable storage device of the coupling device may be configured to modify or destroy the operating certificate after subsequently pairing with the host device a predetermined maximum number of times. Additionally, the coupling device may be configured to restore the original pairing certificate after receiving authorization, for example, from the manufacturer. For example, in the case of an exchange, warranty or repair, the pairing certificates may be re-initialized as long as their serial numbers and other pertinent information were previously registered with the company after purchase. In some embodiments, this may promote and increase the customer's effort to send in the product's registration information to the manufacturer or licensing company.

In other embodiments, such as a demonstration unit use in a retail store to promote the product, the devices could be temporarily paired while operating in a demonstration mode. Accordingly, the device may comprise additional hardware or software protection in order to prevent the customer from making use of the demonstration mode. Alternatively, the store may initially register the product with the manufacturing or licensing company, and re-initialize the pairing certificate with authorization when the unit is sold to a customer.

Depending on the application, in some embodiments the pairing of the modules may be apparent to the user at the initial pairing, for example, by some kind of user interface warning. And in other embodiments, the pairing and securing the interface may be transparent to the user.

Figure 7:
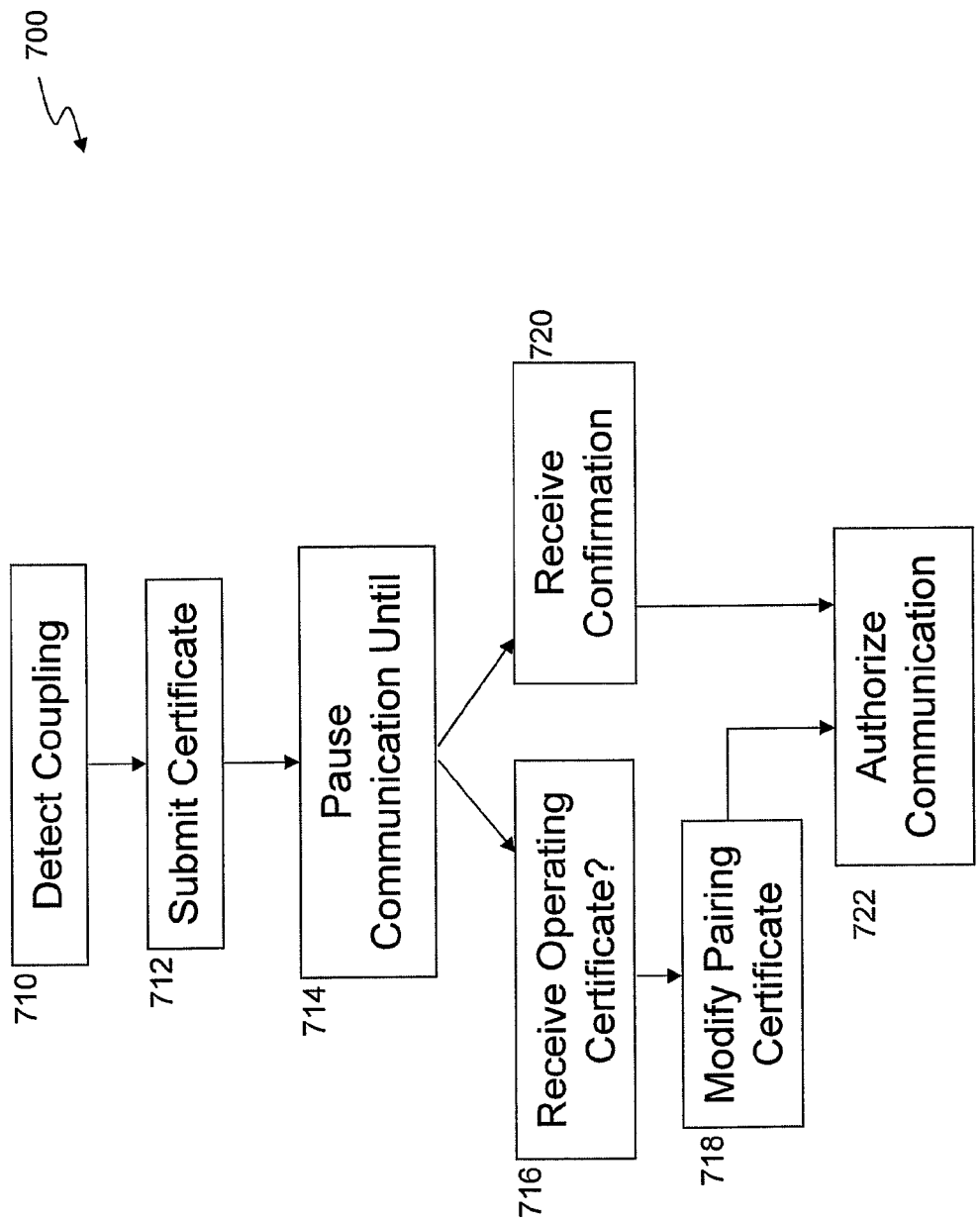
FIG. 7 is a flow diagram of another embodiment for authorizing a communication interface.

Referring next to FIG. 7, a flow diagram of method 700 illustrates another embodiment for authorizing a communication interface between modules. As described above, a coupling device attempts to communicate with a host device. In step 710, the coupling device may detect the coupling and the communication attempt and, in step 712, may automatically submit a certificate of identification to the host device. Next, in step 714, the coupling device may pause communication until it receives either an operating certificate or confirmation of authorization. Accordingly, in step 716, if this is the initial coupling of the coupling device to the host device, once the host device has certified the certificate of identification to be a valid pairing certificate, the host device will send, and the coupling device will receive, the issued operating certificate. Once the coupling device receives the operating certificate, then, in step 718, the coupling device modifies the pairing certificate. Thus, accordingly, in step 722, the coupling device authorizes the communication interface between the host device and the coupling device, and allows communication.

Additionally, if this is a subsequent coupling of the coupling device to the host device, then, in step 720, the host device sends, and the coupling device receives, confirmation that the certificate of identification is a valid operating certificate. Accordingly, in step 722, the coupling device authorizes the communication interface between the host device and the coupling device, and allows communication.

It is noted that although some embodiments described herein include only a first module and a second module, the embodiments may be implemented when more than two modules are coupling together. For example, the first module may couple with the second module and a third module. In other variations, the second module may couple with the first module at a first communication interface and the third module at a second communication interface. Thus, while the invention herein disclosed has been described by means of specific embodiments, examples and applications thereof, numerous modifications and variations could be made thereto by those skilled in the art without departing from the scope of the invention set forth in the claims.

What is claimed is:

1. A method for authorizing a communication interface comprising:
   detecting a coupling between a first electronic device and a second electronic device;
   receiving, at the first electronic device, a first pairing certificate upon detecting the coupling between the first electronic device and the second electronic device;
   certifying the first pairing certificate is valid between the first electronic device and the second electronic device so as to verify the second electronic device is pre-approved to pair with the first electronic device;
   issuing, from the first electronic device, a first operating certificate and storing the first operating certificate on at least one of the first electronic device and the second electronic device; and
   modifying the first pairing certificate after storing a predetermined number of operating certificates to limit the number of electronic devices with which the second electronic device is capable of pairing.

2. The method of claim 1, further comprising:
   confirming the first operating certificate is valid between the first electronic device and the second electronic device; and
   allowing paired communication between the first electronic device and the second electronic device.

3. The method of claim 2, further comprising:
   allowing paired communication between the first electronic device and the second electronic device a predetermined number of times.

4. The method of claim 1, further comprising:
   detecting a subsequent coupling between the first electronic device and the second electronic device including detecting a subsequent attempt to establish communication;
   confirming the first operating certificate is valid between the first electronic device and the second electronic device; and
   allowing paired communication between the first electronic device and the second electronic device.

5. The method of claim 1, further comprising:
   denying communication between the first electronic device and the second electronic device after failing to certify the first pairing certificate between the first electronic device and the second electronic device.

6. The method of claim 1, further comprising:
   detecting a coupling between a third electronic device and at least one of the first electronic device and the second electronic device, wherein the first electronic device and the second electronic device are coupled;
   certifying a second pairing certificate is valid between the third electronic device and the at least one of the first electronic device and the second electronic device; and
   issuing a second operating certificate and storing the second operating certificate on at least one of the first electronic device, the second electronic device and the third electronic device.

7. The method of claim 6, further comprising:
   allowing paired communication between the third electronic device and the at least one of the first electronic device and the second electronic device.

8. The method of claim 1, further comprising:
   restoring the first pairing certificate after having been modified.

9. An apparatus comprising:
   a communication interface configured to detect a coupling with a host device;

a storage device coupled to the communication interface, the storage device configured to store a pairing certificate;

the communication interface further configured to submit the pairing certificate upon detecting an initial coupling with the host device;

the communication interface further configured to receive an operating certificate, store the operating certificate in the storage device, and allow paired communication; and the storage device configured to modify the pairing certificate after storing a predetermined number of operating certificates to limit the number of host devices with which the communication interface is capable of pairing.

10. The apparatus of claim 9, further comprising:

the communication interface configured to submit the operating certificate upon detecting a subsequent coupling with the host device including detecting a subsequent attempt to establish communication.

11. The apparatus of claim 10, further comprising:

the communication interface configured to allow paired communication after receiving confirmation from the host device that the operating certificate is valid.

12. The apparatus of claim 9, further comprising:

the communication interface configured to submit the pairing certificate to a predetermined number of separate host devices.

13. An apparatus comprising:

a communication interface configured to detect a coupling of an electronic device;

a certifying module coupled to the communication interface, the certifying module configured to certify a pairing certificate received from the electronic device;

the certifying module further configured to issue an operating certificate to the electronic device after having certified the pairing certificate;

the certifying module further configured to authorize the communication interface to allow paired communication with the electronic device after having issued the operating certificate; and the communication interface configured to require the electronic device to modify the pairing certificate after issuing the operating certificate to the electronic device to limit the number of communication interfaces with which the electronic device is capable of pairing.

14. The apparatus of claim 13, further comprising:

the certifying module configured to deny paired communication between the electronic device and the communication interface after having failed to certify the pairing certificate.

15. The apparatus of claim 13, further comprising:

the certifying module configured to certify the pairing certificate is one among a list comprising one or more pairing certificate corresponding to a pre-approved electronic device.

16. The apparatus of claim 13, further comprising:

the certifying module configured to access a wide area network.

17. The apparatus of claim 13, further comprising:

the certifying module configured to access a wide area network to certify the pairing certificate is listed in a database of pre-approved modules with which the host device can authorize a communication interface.

* * * * *